May 21, 1968     M. TIBORCZ     3,384,144
LONG WEAR SAFETY TIRE TREAD

Filed Dec. 28, 1965     4 Sheets-Sheet 1

INVENTOR.
MICHAEL TIBORCZ
BY *Louis Candela*

ATTORNEY

INVENTOR.
MICHAEL TIBORCZ
BY Louis Candela
ATTORNEY

INVENTOR.
MICHAEL TIBORCZ
BY Louis Candela
ATTORNEY

United States Patent Office 3,384,144
Patented May 21, 1968

3,384,144
LONG WEAR SAFETY TIRE TREAD
Michael Tiborcz, 714 W. Market St.,
Akron, Ohio 44303
Filed Dec. 28, 1965, Ser. No. 516,992
9 Claims. (Cl. 152—209)

ABSTRACT OF THE DISCLOSURE

A pneumatic tire having a ground contacting surface that is divided into sections by circumferential grooves. Each of said sections containing a series of substantially V-shaped grooves grouped in a repetitive pattern about the circumference of the tire.

---

This invention, in general, relates to vehicle tires. More particularly, this invention relates to tire treads or to that portion of the tire intended for contact with the surface upon which a vehicle is driven.

When the increase in the speed of vehicles caused a transition from solid rubber tires to the air-cushion or pneumatic tire, there resulted a somewhat radical change in the configuration of a tire since any balloon-type container of air is rounded. Consequently, it became necessary to "build-up" the pneumatic tire, particularly at its area of greatest stress which is that portion of the tire customarily intended for contact with a driving surface. Thus, the tread stock or portion of the tire is the "connection," so to speak, between the tire body and a driving surface imparting needed strength and assuring a more even distribution of road shocks.

Other problems in the transition became evident. For instance, since pneumatic tires are made of a relatively soft rubber, the tendency to side-slip became greater than with the use of solid rubber. This problem together with the companion and much more severe problem of skidding forced tire manufacturers to confront the serious factor of safety. Consequently, the smooth tread was eliminated and the tire tread has since been provided with innumerable varieties of angles and edges to promote traction, to provide protection against skidding, and in a very real sense provide a mechanical inter-relationship between tire and driving surface.

The character of the tread must be considered from a number of different viewpoints. The relationship of the tread to the casing, for instance, dictates care since the wearing surface or tread must not be of such toughness as to intensify strain on the sidewalls or in any other way jeopardize tire resiliency. Problems of this specific nature seem now to be well overcome as witnessed by the mushroomed re-capping industry indicating the survival of the tire body after the tread has been nearly or completely worn away.

Another consideration of concern in the character of the treads is the matter of comfort. Some tread arrangements produce a thumb or other driving shock to at least aggravate, if not endanger, the driver. Although much improved, the comfort factor is still somewhat of nuisance. It is the character of most modern treads, for instance, to "wear" from a primary design to a secondary design which, in most cases, seems to be somewhat of a sacrifice in safety to preserve comfort.

Manufacturers of tires have, of course, reacted to changes in vehicles and vehicular application. As is known, tire treads can be made to deform certain kinds of surfaces and, consequently, tires have found considerable use on a variety of off the road vehicles. Perhaps, though, the main and continuing challenge to tire manufacturers is the progressive and constantly increasing speed of the vehicles. More speed means more frictional heat which, in turn, demands more from a tire and its tread character, particularly as applies to the safety and wear features of the tire tread.

As previously mentioned, smooth tread disappeared for reasons of safety. The vehicle, through its tires, had to be made to "grip" the road during all phases, including cornering, of sensible road operation. Early efforts toward "roughening" the tire tread were cumbersome and uncomfortable because of stud or letter protrusion. However, tire tread traction and a smooth ride soon became a reasonable accomplishment by depressing away a portion of the tread from a circumferentially continuous outer surface. The depressions, for instance, may be achieved in such a manner so that the outer surface might be a series of interrelated bars, angles, or chevrons set transversely or, at least, radically angled in relation to the direction of travel. Apparently, the thinking is that the degree of angle from the direction of travel must, to some extent, be somewhat radical in order to assure the ability of the tire tread to grip the road. Unfortunately, these relatively great degrees of angle seem to contribute to premature tread wear which, in turn, would make the tire prematurely unsafe.

It has been found, however, that the angular character imparted to tire treads need not be severe with respect to the direction of vehicle travel. The irregular pattern necessary to traction capability can be accomplished progressively, not abruptly, to thereby preserve the comfort and wear of the tire while achieving increased factors of safety in ride operation.

It is, therefore, the primary object of this invention to provide a vehicle tire having a tread character capable of surviving wear and retaining safety characteristics throughout practically the entire usable life of the tire.

Another object of this invention is to provide a tread character in a tire which is durable in wear without, in any way, reducing the safety factors by imposing limitations on the traction ability of the tire.

A still further object of this invention is to provide a tread character in which necessary angularity with respect to vehicle direction is accomplished progressively.

These and other objects will become apparent upon a reading of the following brief description considered and interpreted in the light of the accompanying drawings.

Figure 1:
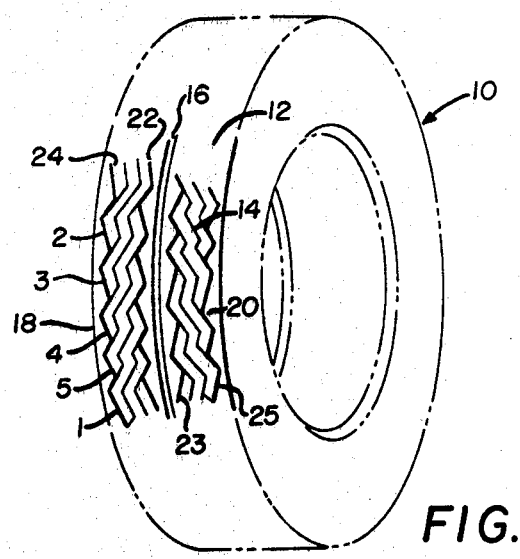
FIGURE 1 is an isometric view of a tire in outline form showing a portion of its improved tread character.
Figure 3:
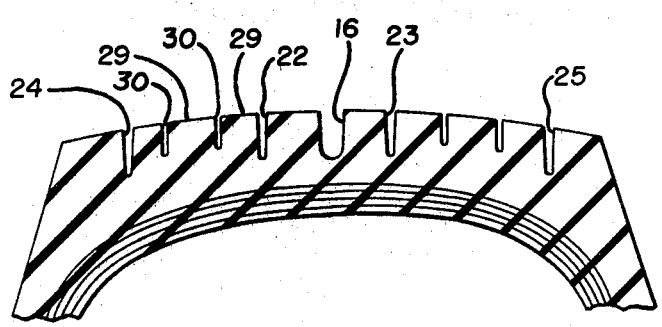
FIGURE 3 is a cross section taken on the line 3—3 of FIGURE 2.
Figure 2:
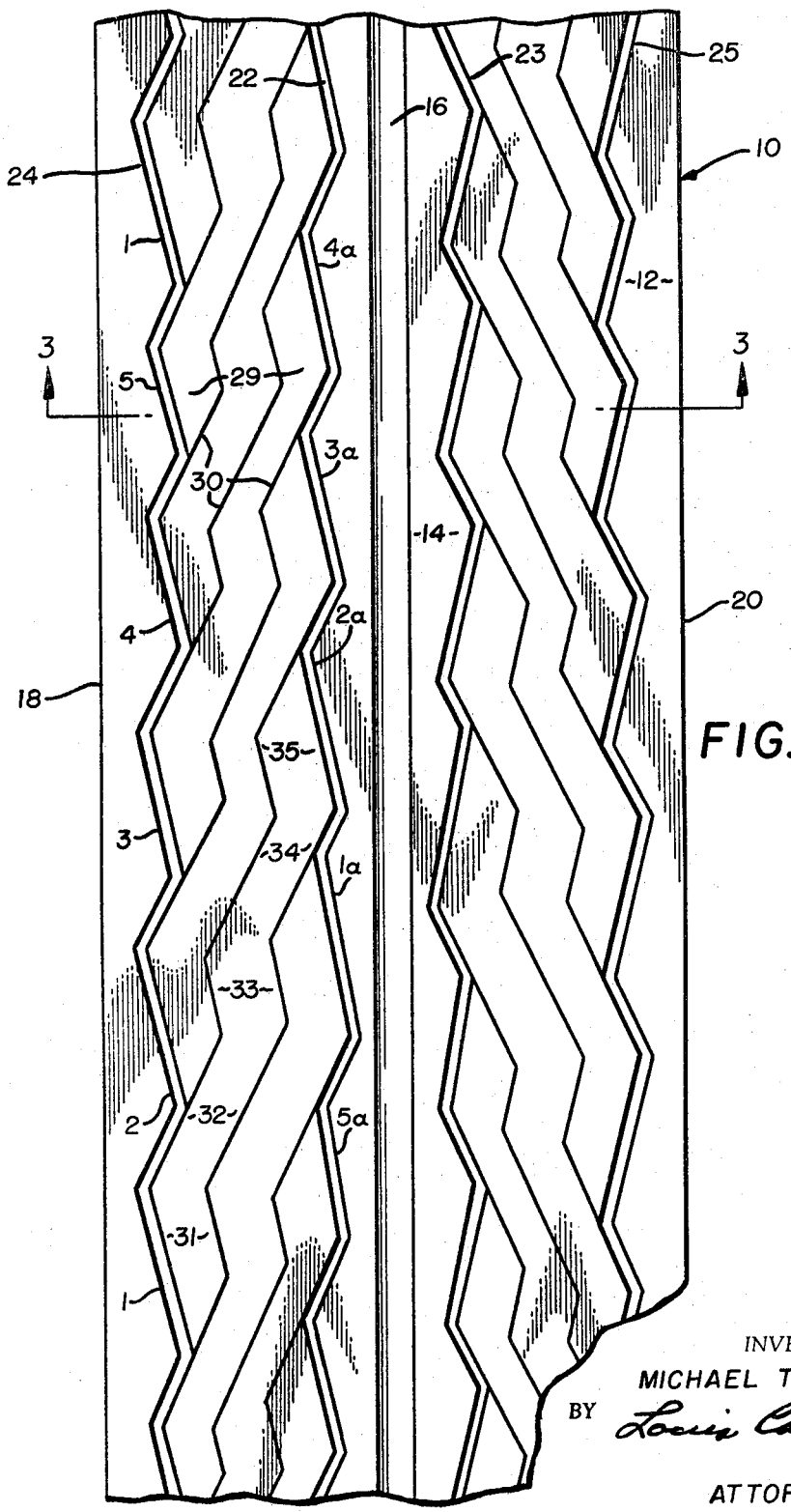
FIGURE 2 is a plan view of a fragmentary portion of the improved tread character.
Figure 4:
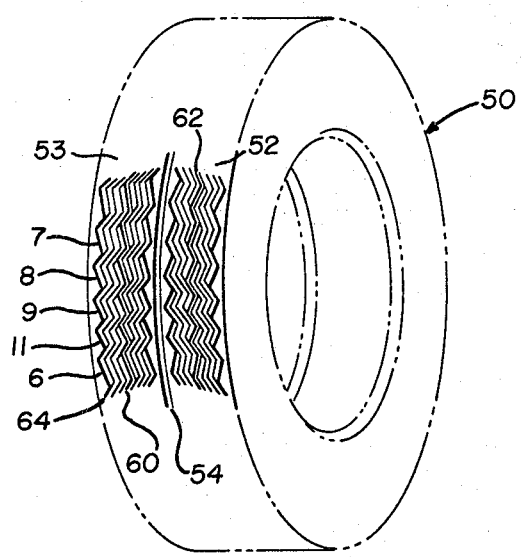
Figure 6:
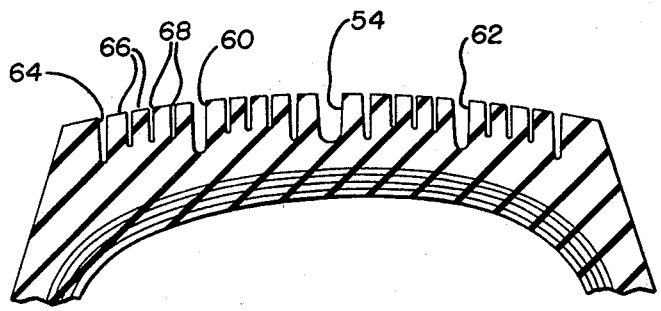
Figure 5:
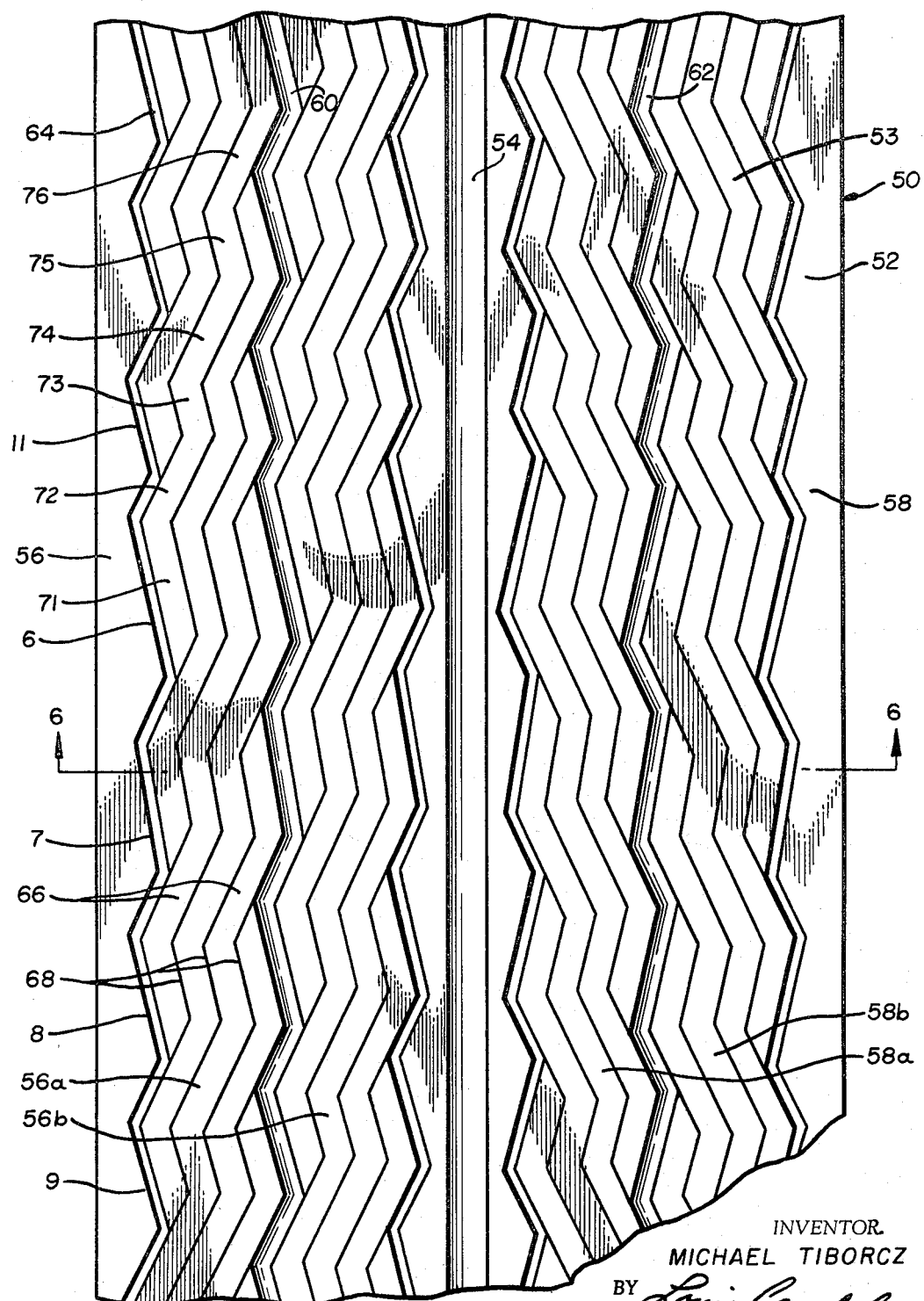

FIGURES 4, 5, and 6 are views similar to FIGURES 1, 2, and 3, respectively, but showing the improved tread character of this invention in a modified embodiment.

Referring now to the drawings and particularly to FIGURE 2, the tire, generally designated by the numeral 10, is shown with its road contact surface 12 in a necessary irregular condition produced by the novel tread character 14. All angles and edges pertinent to proper traction are present as will hereinafter become evident.

A circumferentially extending groove 16 separates the surface 12 into two substantially equal sections 18 and 20. A separation of this pronounced kind enables a portion of the tire to remain in contact with the driving surface when a part of the tire has been forced to lift from the surface under certain driving manipulations as, for instance, making a sharp turn at high speed.

Transversely spaced on either side of the groove 16 and also circumferentially extending are grooves 22 and 23 of endless spread V configuration. Transversely spaced from the groove 22 is another V-configurated groove 24 with a similar groove 25 being transversely spaced from the groove 23.

In order to eliminate constancy and to thereby reduce heat generation the grooves 22, 23, 24, and 25 are constructed so that the successive V's in the configuration are never of the same dimension. To accomplish this purpose, the V's have a definite pattern or grouping and, in the embodiment shown, the V's are patterned in groups of five. In reference to section 18, groove 24, and to the numerals 1, 2, 3, 4, and 5, it will be seen that the V's, starting with the one indicated by 1 become progressively smaller as they move toward the V indicated by the numeral 5. The groove 22 is patterned in like manner with the grouping being indicated by the numerals 1a, 2a, 3a, 4a, and 5a. A staggering will be noticeable so that at no time is the apex of a V of groove 22 ever transversely opposite the apex of a V of groove 24.

The same basic pattern is retained in the construction of the cross-ribs 29, 29 and the associated cross grooves or splits 30, 30. Selecting, for descriptive purposes, the rib associated with the V indicated by 1, it will be seen that the rib contains a pattern of segments 31, 32, 33, 34, and 35 as it moves transversely from the groove 24 to the groove 22. In this manner the ribs 29, 29 and the splits 30, 30 are in basic extension transverse to the dimension of travel but this relationship is not abrupt or acute. The relationship is accomplished progressively through use of the segments and, obviously, without any sacrifice in angles and edges necessary for traction. In fact, the arrangement permits the splits 30, 30 to be cut relatively to a greater depth to assure retaining the primary tread character throughout the usable life of the tire.

Additional detail with respect to section 20 is not considered necessary but will be understood from the description of section 18 as above given.

In the modification illustrated by FIGURES 4, 5, and 6, with particular reference to FIGURE 5, the invention is shown embodied in a tire 50. Here, the road contact surface 52 may be wider or more tread irregularity in the tread character 53 is desired than what was shown and described in connection with the preferred embodiment. The center circumferential groove 54, as before, divides the tire 50 into two sections 56 and 58. Each section, through means of spread V configurated grooves 60 and 62 are further divided into sub-sections 56a, 56b, and 58a, 58b, respectively. Since the construction of each sub-section will be apparent upon the description of one, only 56a will be described in detail.

Transversely spaced from the groove 60 is the groove 64 which is also of circumferentially extending endless spread V configuration. Here, again, the V's are patterned in groups of five of successive diminishing dimension as shown by the numerals 6, 7, 8, 9, and 11. The cross-ribs 66, 66 and their associated cross grooves or splits 68, 68 are, as before, segmented for progressive movement in transverse direction from the groove 64 to the groove 60. But, since in this embodiment, the cross-ribs are placed closer together and thereby made more numerous, an additional segment is employed. It will be seen, for instance, that the rib associated with the V indicated as 6 is comprised of segments 71, 72, 73, 74, 75, and 76.

There has been shown, then, a tire having a tread character which has been made durable and long-lasting while, at the same time, retaining and increasing all of the necessary safety features. Though not acute, there are sufficient angles and edges provided to assure obedience on command of a driver even under conditions of an emergency nature. The irregular pattern necessary for traction is accomplished progressively resulting in increased safety, tire wear, and comfort of ride.

While a full and complete description of the invention has been set forth, it is to be understood that the invention is not intended to be so limited. Accordingly, modifications may be resorted to without departing from the spirit hereof within the scope of the appended claims.

What is claimed is:

1. In a tire, a tread character, comprising; a tread portion having a ground contacting surface; a circumferentially extending medial groove dividing said tread portion into two substantially equal sections; dividing said surface into two substantially equal sections; each said section having circumferentially extending endless spread V-configurated grooves spaced from each other and from said medial groove; the V's of said V-configurated grooves patterned into a definite group controlling and varying the dimension of each successive V; means extending between said V-configurated grooves providing angles and edges substantially transverse to said V-configurated grooves.

2. The device of claim 1 wherein each said section contains two said V-configurated grooves spaced from each other.

3. The device of claim 2 wherein said V's are patterned in groups of five with each V of each said group being of different dimension.

4. The device of claim 3 wherein cross-ribs and associated splits extend transversely between said V-configurated grooves.

5. The device of claim 4 wherein said ribs and splits are segmented for progressive movement in transverse direction from one said V-configurated groove to the other said V-configurated groove.

6. The device of claim 1 wherein the first of said V-configurated grooves are spaced to either side of said medial groove dividing each said section into substantially equal sub-sections and the second of said V-configurated grooves are spaced to either side of said first groove.

7. The device of claim 6 wherein the V's of said first and second V-configurated grooves are patterned in groups of five with each V of each said group being of different dimension.

8. The device of claim 7 wherein cross-ribs and associated splits extend transversely between said first and said second V-configurated grooves.

9. The device of claim 8 wherein said ribs and splits are segmented for progressive movement in transverse direction between said first and said second V-configurated grooves.

References Cited

UNITED STATES PATENTS 3,094,157 6/1963 Klöhn _____ 152—209
3,286,756 11/1966 Ellenrieder _____ 152—209

ARTHUR L. LA POINT, *Primary Examiner.*

Y. P. SCHAEVITZ, C. B. LYONS, *Assistant Examiners.*